(12) United States Patent
Izawa

(10) Patent No.: US 8,713,353 B2
(45) Date of Patent: Apr. 29, 2014

(54) COMMUNICATION SYSTEM INCLUDING A SWITCHING SECTION FOR SWITCHING A NETWORK ROUTE, CONTROLLING METHOD AND STORAGE MEDIUM

(75) Inventor: Tetsu Izawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 13/137,351

(22) Filed: Aug. 8, 2011

(65) Prior Publication Data

US 2011/0296232 A1  Dec. 1, 2011

Related U.S. Application Data

(63) Continuation of application No. PCT/JP2010/051835, filed on Feb. 9, 2010.

(30) Foreign Application Priority Data

Feb. 9, 2009  (JP) .................................. 2009-027376

(51) Int. Cl.
*G06F 11/00* (2006.01)

(52) U.S. Cl.
USPC .............................. 714/4.11; 714/43; 714/6.3

(58) Field of Classification Search
None
See application file for complete search history.

(56) References Cited

U.S. PATENT DOCUMENTS

| | | | | |
|---|---|---|---|---|
| 7,293,192 | B2* | 11/2007 | Allen et al. ..................... | 714/6.3 |
| 7,451,345 | B2* | 11/2008 | Butterworth et al. ........... | 714/6.3 |
| 7,725,764 | B2* | 5/2010 | Morosan et al. ................ | 714/4.12 |
| 2002/0120884 | A1 | 8/2002 | Nakamikawa et al. | |
| 2004/0225725 | A1 | 11/2004 | Enomoto et al. | |
| 2006/0174012 | A1 | 8/2006 | Yamazaki et al. | |
| 2006/0206611 | A1 | 9/2006 | Nakamura | |
| 2006/0250951 | A1 | 11/2006 | Ueda et al. | |
| 2008/0126832 | A1 | 5/2008 | Morosan et al. | |
| 2010/0017648 | A1* | 1/2010 | Teruta et al. ..................... | 714/4 |
| 2011/0225448 | A1* | 9/2011 | Morosan et al. ............. | 714/4.11 |

FOREIGN PATENT DOCUMENTS

| | | |
|---|---|---|
| JP | 10-320323 (A) | 12/1998 |
| JP | 2002-259155 (A) | 9/2002 |
| JP | 2004-304364 (A) | 10/2004 |
| JP | 2006-215635 (A) | 8/2006 |
| JP | 2006-253900 (A) | 9/2006 |
| JP | 2008-28456 (A) | 2/2008 |
| JP | 2008-199081 A | 8/2008 |
| WO | WO 2004/075482 A1 | 9/2004 |
| WO | WO 2005/057864 (A1) | 6/2005 |

OTHER PUBLICATIONS

International Search Report (ISR) (PCT Form PCT/ISA/210) dated Mar. 9, 2010, with English translation.

(Continued)

*Primary Examiner* — Christopher McCarthy
(74) *Attorney, Agent, or Firm* — McGinn IP Law Group, PLLC

(57) ABSTRACT

Whether or not a signal which is transmitted from a current operation side node to a stand-by side node has been disconnected is determined on a communication route for the signal. When the signal is determined to have been disconnected, the network route is switched to the network route used when a client unit and the stand-by side node perform data communication. With this, the switching of the network route when processing having been performed by a node of a system is performed by another node in place of the node can be made quickly.

15 Claims, 13 Drawing Sheets

(56) References Cited

OTHER PUBLICATIONS

Chinese Office Action dated Sep. 18, 2013 with an English translation.

Japanese Office Action dated Oct. 21, 2013 with an English translation.

Japanese Office Action dated Feb. 12, 2014 with a partial English translation.

* cited by examiner

Fig. 3

| FLOW INFORMATION | OUTPUT PORT INFORMATION | OPERATION INFORMATION AT DISCONNECTION |
|---|---|---|
| FLOW A | N | NO |
| FLOW B | L | OUTPUT FLOW AT NETWORK ADDRESS Z TO COMMUNICATION PORT L |

MODE AFTER OCCURRENCE OF FAULT

Fig. 11

| FLOW INFORMATION | OUTPUT PORT INFORMATION | OPERATION INFORMATION AT TRANSMISSION START |
|---|---|---|
| FLOW A | N | NO |
| FLOW B | L | OUTPUT FLOW AT NETWORK ADDRESS Z TO COMMUNICATION PORT L |

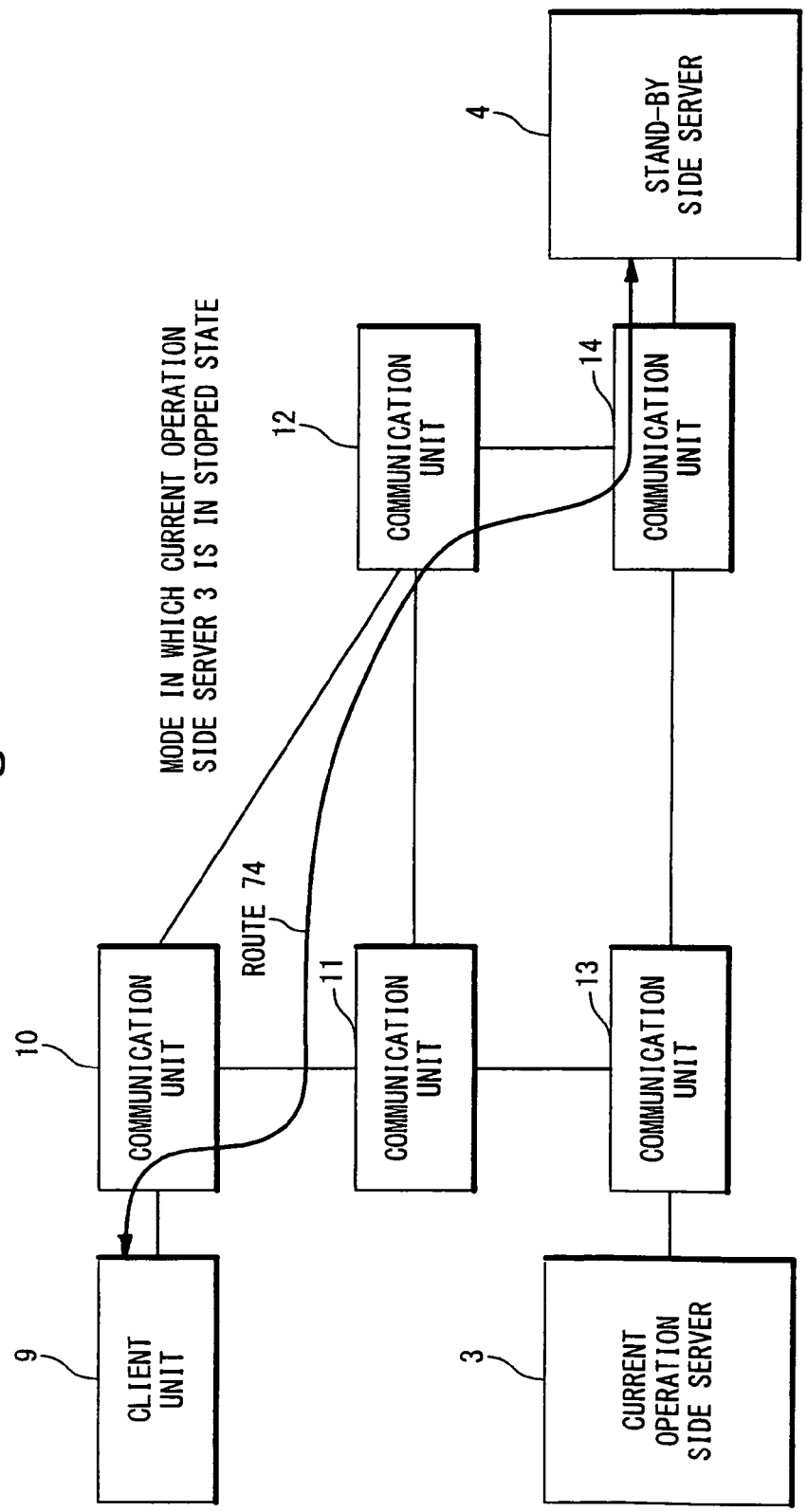

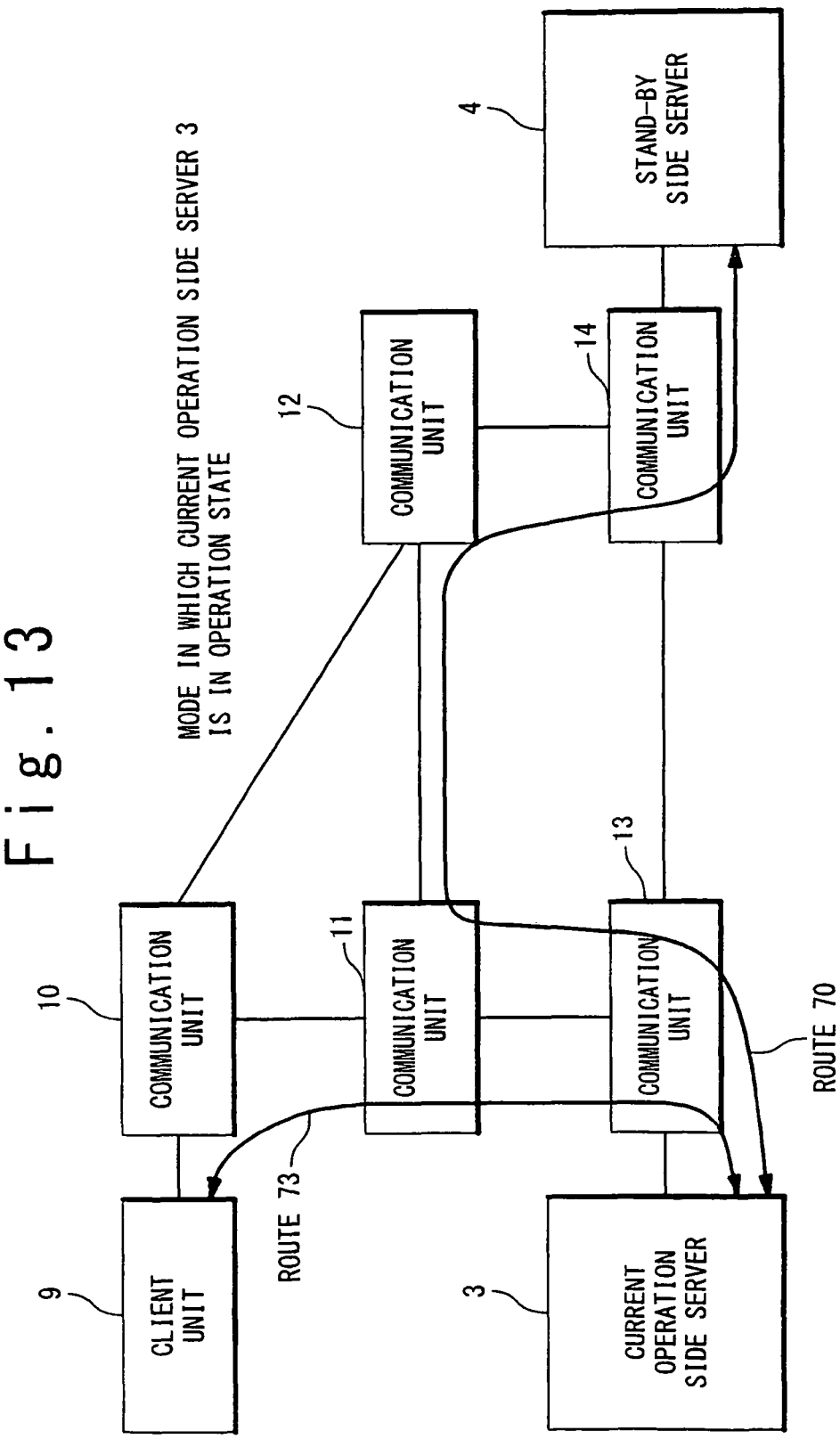

COMMUNICATION SYSTEM INCLUDING A SWITCHING SECTION FOR SWITCHING A NETWORK ROUTE, CONTROLLING METHOD AND STORAGE MEDIUM

CROSS-REFERENCE TO RELATED APPLICATION

This is a continuation of International Application No. PCT/JP2010/051835, filed on Feb. 9, 2010.

TECHNICAL FIELD

The present invention is related to a communication system which a stand-by side node performs processing in place of a current operation side node when the current operation side node cannot perform the processing, in the communication system including the current operation side node used usually and the stand-by side node different from the current operation side node.

RELATED ARTS

A fail-over is widely used in a communication system which needs a redundancy.

In the fail-over, a stand-by side node is provided separately from a current operation side node used usually, and the stand-by side node takes over processing when a fault has occurred in the current operation side node.

However, in addition to the taking-over of the processing, it is necessary that the route setting in the network is switched and the communication for the current operation side node must be switched to the stand-by side node.

Also, when the current operation side node operates again, the communication having switched to the stand-by side node must be switched to the current operation side node again.

A procedure of the switching of the processing from the current operation side node to the stand-by side node and the switching of the communication route on the network in accompaniment with the switching of the processing can be described as follows:

(1) The stand-by side node detects a fault in the current operation side node;

(2) The stand-by side node shifts to an execution state;

(3) The stand-by side node requests a network route switch to network units or a network control unit;

(4) Each of the network units or the network control unit changes the network route (communication route).

However, the network unit means a communication unit such as a router and a switch, and a network control unit means a unit which controls the network unit.

The above items (1) to (4) are explained in the related art, for example, JP 2006-253900A (Patent Literature 1).

In Patent Literature 1, (1) when a server in a stand-by mode detects the disconnection of a heartbeat communication, the operation mode is changed to the execution mode (2). The server in the stand-by mode transmits a message (for switching the network route) so as to switch a server in an execution mode to the stand-by mode in a broadcast form (3). The server in the execution mode shifts to the stand-by mode when receiving the message (4).

Also, a technique to reduce a time necessary for current operation side fault detection in the above (1) is disclosed in JP 2002-259155A (Patent Literature 2).

In Patent Literature 2, a software failure of an application is monitored and when a fault has occurred, the fault occurrence is notified to another system at once through an exclusive-use communication section. Thus, the fault detection is performed without waiting for disconnection of a heartbeat signal and the fault detection time is tried to be shortened.

CITATION LIST

[Patent Literature 1]: JP 2006-253900A
[Patent Literature 2]: JP 2002-259155A

SUMMARY OF THE INVENTION

However, in Patent Literature 1, because the route switching is performed after the fault detection, it takes time by completion of the route switching.

Also, in Patent Literature 2, the technique to attempt to reduce a fault detection time is disclosed, but the route switching on the network is not considered. Also, in Patent Literature 2, because a time to taken to detect abeyance of the application by a monitoring unit is not considered, it is not always possible to reduce the fault detection time.

The present invention is accomplished in view of the above situations, and the subject matter of the present invention is to provide a communication system, a communication unit, a control unit, and a control method, in which the switching operation to a network route required when an node performs processing having been performed by another node in a system can be earlier carried out.

The communication system according to the present invention is provided with a client unit, first and second nodes, communication units and a determining section. The first node performs processing in response to a request from the client unit. The second node performs the processing in place of the first node when a fault has occurred in the first node. The communication units configure network routes between the client unit, the first node and the second node. The determining section is provided onto a first network route and determines disconnection of a signal which is transmitted from the first node to the second node through the first network route. The communication unit is provided with a switching section configured to switch the network route which is used to transfer data from the client unit to a predetermined network address, to another network route based on the determination result of the determining section. The switching section switches the network route between a second network route used when the client unit and the first node perform data communication, and a third network route used when the client unit and the second node perform data communication based on the determination result.

A control method of the present invention is a control method in a communication system which is provided with a client unit, a first node which performs processing in response to a request from the client unit, a second node which performs the processing in place of the first node when a fault has occurred in the first node, communication units which configure network routes among the client unit, the first node and the second node, and a control unit provided onto the first network route. The control method of the present invention includes a step of determining, by a determining section provided onto a first network route, disconnection of a signal that which is transmitted from the first node to the second node through a first network route; a step of switching a network route which is used to transfer data from the client unit to predetermined network address to another network route based on the determination result of the determining section. The switching step includes switching the network route between a second network route used when the client unit and the first node perform data communication, and a third network route used when the client unit and the second node perform data communication, based on the determination result.

It is desirable that the control method of the present invention is realized by use of a control program which the communication units execute.

Also, the control program of the present invention is a control program to make the control units perform a control method performed in a communication system which is provided with a client unit, a first node which performs processing in response to a request from the client unit, a second node which performs the processing in place of the first node when a fault has occurred in the first node, communication units which configure network routes among the client unit, the first node and the second node, and a control unit provided onto the first network route. In this case, the control method of the present invention includes a step of determining, by a determining section provided onto a first network route, disconnection of a signal that which is transmitted from the first node to the second node through a first network route; a step of switching a network route which is used to transfer data from the client unit to predetermined network address to another network route based on the determination result of the determining section. The communication units switch the network route between a second network route used when the client unit and the first node perform data communication, and a third network route used when the client unit and the second node perform data communication, in response to a control signal.

According to the present invention, the switching operation of the network route which is required when a node performs processing which has been performed by another node of a system can be quickly performed.

BRIEF DESCRIPTION OF THE DRAWINGS

The objects, effects, and features of the present invention could be understood in conjunction with the description of the exemplary embodiments and the following drawings:

FIG. 3 is a diagram showing a table configuration of a flow table;

FIG. 11 is a diagram showing a table configuration of a flow table;

FIG. 12 is a diagram showing a communication route when the current operation side server is in a stop state; and FIG. 13 is a diagram showing a communication route when the current operation side server is in an operation state.

DESCRIPTION OF EXEMPLARY EMBODIMENTS

First Exemplary Embodiment

<System Configuration of Communication System>

Figure 1:
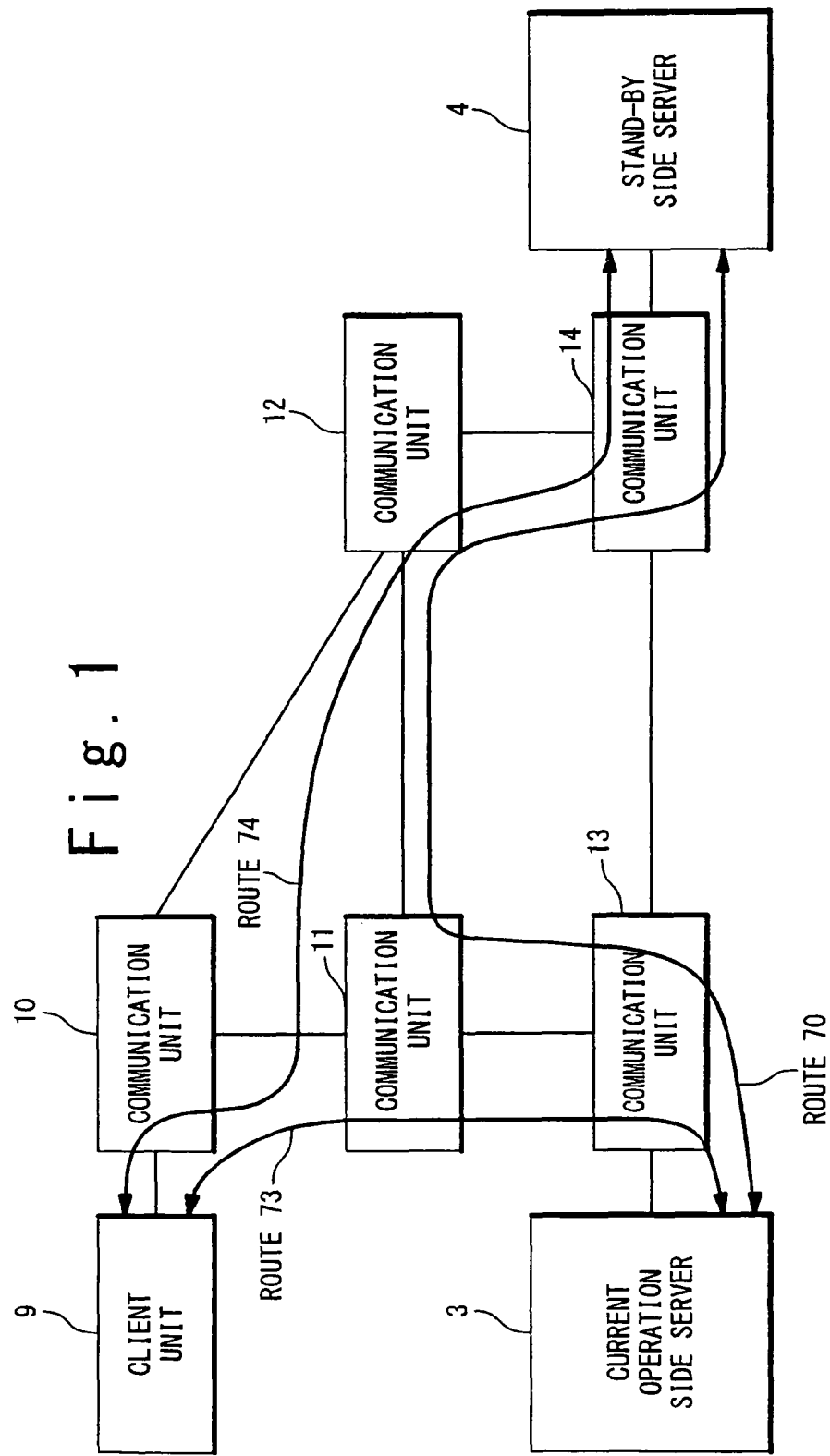
FIG. 1 is a diagram showing a system configuration of a communication system according to a first exemplary embodiment of the present invention.

Hereinafter, a configuration of a communication system according to a first exemplary embodiment of the present invention will be described with reference to FIG. 1.

The communication system of the present exemplary embodiment is provided with a client unit 9, a current operation side server 3, a stand-by side server 4 and a plurality of communication units 10 to 14.

The current operation side server 3 and the stand-by side server 4 are nodes on which service applications can operate.

The client unit 9 is a unit to utilize the service application which operates on the current operation side server 3 and the stand-by side server 4.

In the present exemplary embodiment, the current operation side server 3 in a normal operation state performs processing of a service request from the client unit 9. When a fault has occurred in the current operation side server 3 so that the operation of the service application by the current operation side server 3 becomes impossible, the stand-by side server 4 takes over the processing of the current operation side server 3 and performs processing of a service request from the client unit 9.

The determination of whether or not the fault has occurred in the current operation side server 3 is performed by using a heartbeat signal. In detail, the current operation side server 3 transmits the heartbeat signal to the stand-by side server 4. When receiving the heartbeat signal, the stand-by side server 4 determines that the current operation side server 3 is in a normal operation state. When the heartbeat signal cannot be received, the stand-by side server 4 determines that the fault has occurred in the current operation side server 3.

The communication units 10 to 14 are communication units (network units) such as routers and switches, and network routes 73, 74, and 70 are configured between the client unit 9, the current operation side server 3, and the stand-by side server 4.

Figure 2:
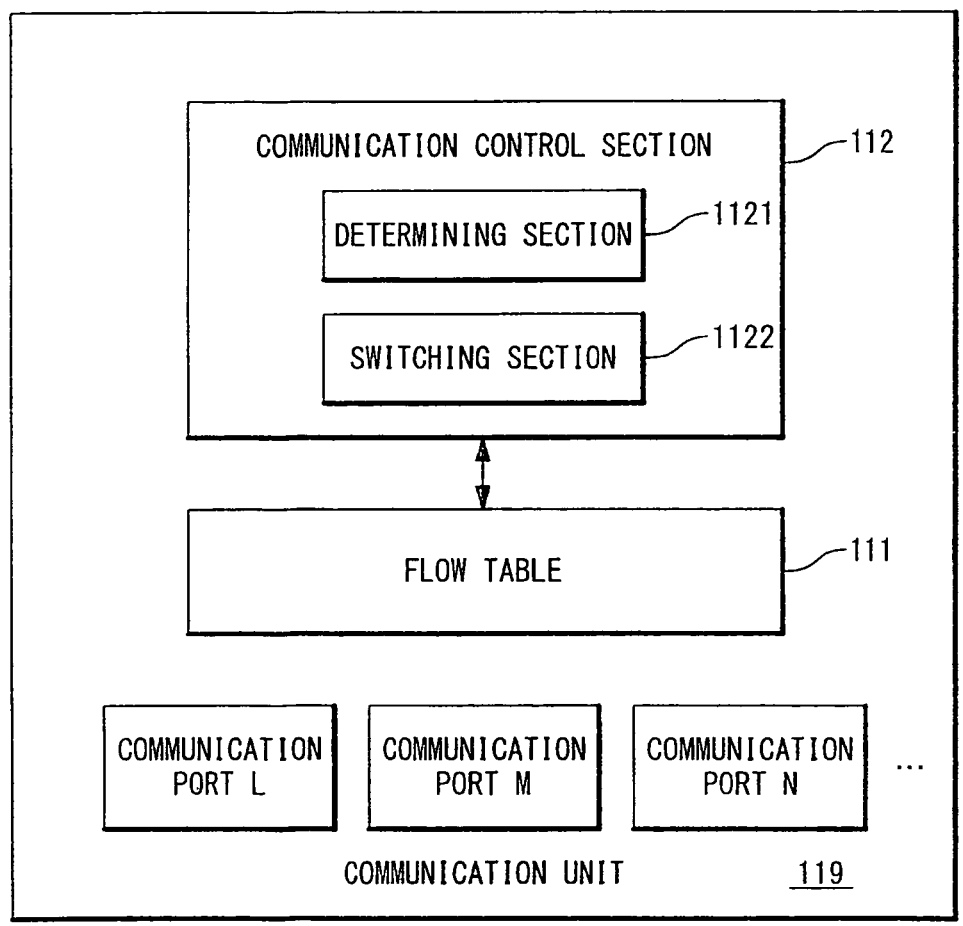
FIG. 2 is a diagram showing a configuration of a communication unit.

As shown in FIG. 2, each of the communication units 10 to 14 is provided with a flow table 111, a communication control section 112, and a plurality of communication ports (L to N) 119.

As shown in FIG. 3, the flow table 111 manages a set of "flow information", "output port information", and "operation information at disconnection". With this, the communication units 10 to 14 can control a data transfer destination based on the flow information. The information to be managed in the flow table 111 can be set or changed manually from an external unit or dynamically by the communication units 10 to 14.

The "flow information" is information to specify identification information of each flow. The "output port information" is information to specify the communication port from which data should be outputted. The "operation information at disconnection" is information showing the operation to be done when a flow has been disconnected.

For example, according to the flow table 111 shown in FIG. 3, the communication units 10 to 14 operate as follows. That is, when receiving data of a flow A, the communication unit outputs the data of the flow A from the communication port N and performs no operation at time of disconnection (in the state that the flow A has been disconnected). Also, when receiving data of a flow B, the communication unit outputs the data of the flow B from the communication port L. On the other hand, when receiving the flow of a network address Z in the state that the flow B has been disconnected, the communication unit outputs the flow of the network address Z from the communication port L.

The communication control section 112 refers to the flow table 111 to perform data transfer processing according to the flow table 111. The communication control section 112 is provided with a determining section 1121 and a switching section 1122.

The determining section 1121 determines whether or not a network route should be switched, based on the heartbeat signal which is transmitted from the current operation side server 3 to the stand-by side server 4. The switching section 1122 switches the network route in accordance with the determination result by the determining section 1121.

<Processing Operation of Communication System>

Figure 4:
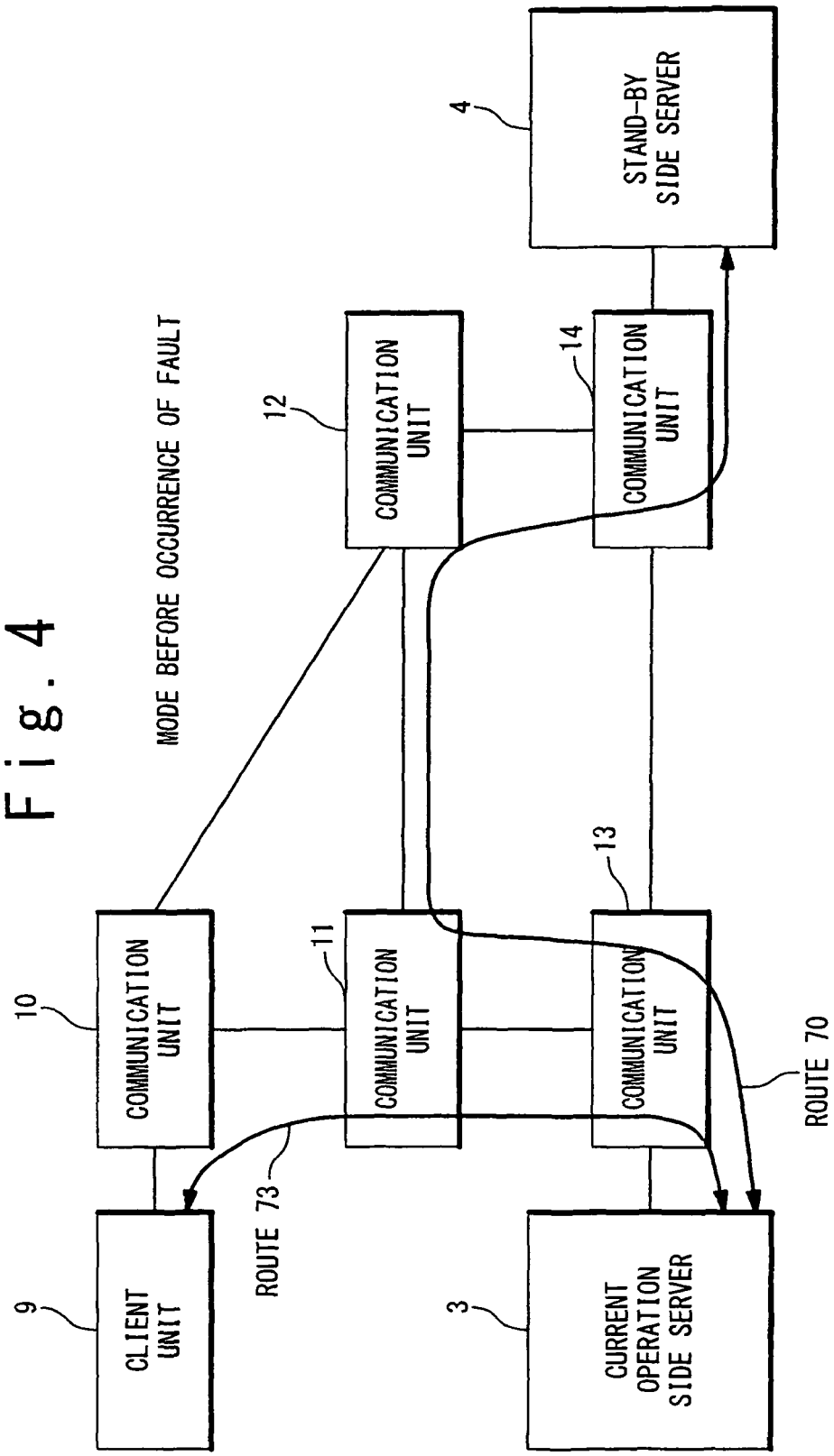
FIG. 4 is a diagram showing a communication route in a state before a fault occurs in a current operation side server.
Figure 5:
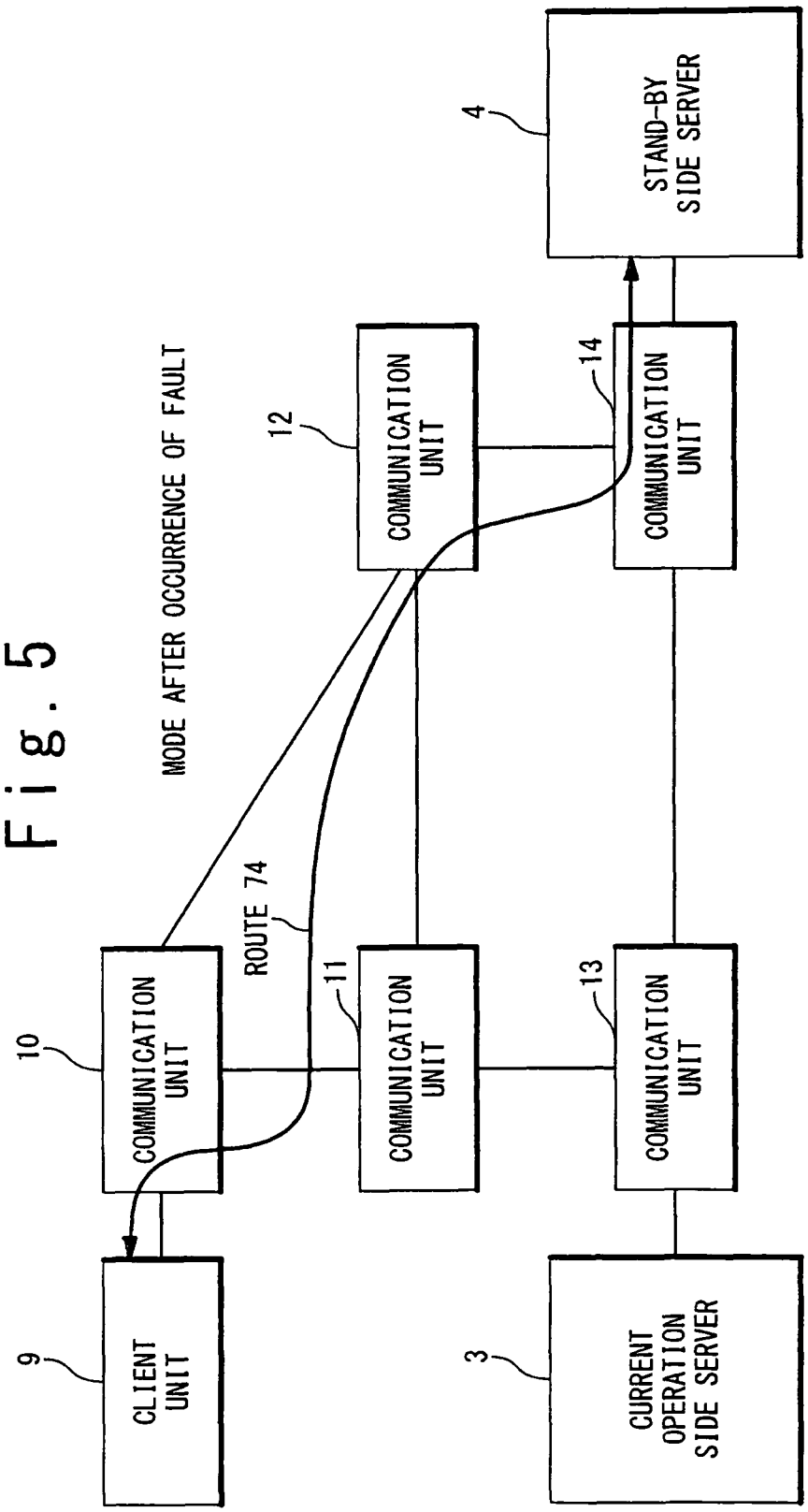
FIG. 5 is a diagram showing a communication route in a state after the fault has occurred in the current operation side server.

Next, referring to FIG. 1, FIG. 4, and FIG. 5, the processing operation of the communication system in the present exemplary embodiment will be described. FIG. 4 shows a communication route in a state before a fault occurs in the current operation side server 3, and FIG. 5 shows the communication route in a state after the fault has occurred in the current operation side server 3.

(Precondition)

It is supposed that the current operation side server 3 is operating normally, and is in the state that a service request from the client unit 9 can be processed, as the precondition of the communication system in the present exemplary embodiment.

The stand-by side server 4 receives the heartbeat signal periodically from the current operation side server 3. When the heartbeat signal can be received, the current operation side server 3 is determined to be in a possible state of service provision (an operation state). The stand-by side server 4 shifts to a stand-by mode when the current operation side server 3 is in the possible state of service provision. Also, when the heartbeat signal cannot be received in a predetermined period, the stand-by side server 4 determines that the current operation side server 3 is in an impossible state of service provision (a fault occurrence state). The stand-by side server 4 shifts to an execution mode when the current operation side server 3 is in the impossible state of service provision. The stand-by side server 4 uses network addresses used by the current operation side server 3 and takes over the processing being performed by the current operation side server 3.

Referring to FIG. 1, the communication route between the client unit 9 and the current operation side server 3 is a route 73 through the communication unit 10, the communication unit 11 and the communication unit 13. The route 73 is defined as using the communication port M. The communication route between the client unit 9 and the stand-by side server 4 is a route 74 through the communication unit 10, the communication unit 11, the communication unit 12, and the communication unit 14. The route 74 is defined as using the communication port L. The communication route of the heartbeat signal from the current operation side server 3 to the stand-by side server 4 is a route 70 through the communication unit 13, the communication unit 11, the communication unit 12, and the communication unit 14. The route 70 is defined as using the communication port L. Also, the flow of the heartbeat signal is defined as using a flow B.

It is supposed that the current operation side server 3 and the stand-by side server 4 have mechanisms by which mutual communication is made possible, to transmit and receive the heartbeat signal. For example, it is supposed that the current operation side server 3 and the stand-by side server 4 have the mechanisms which can use a method of assigning different addresses from the addresses used for service provision, a method of using a name solution system and so on.

It is supposed that the network address used to provide a service to the client unit 9 is defined as Z and that the current operation side server 3 is using the network address Z.

(State Before Fault Occurrence)

When the current operation side server 3 is operating, the current operation side server 3 performs processing of a service request supplied from the client unit 9 through the route 73, as shown in FIG. 4. Also, the current operation side server 3 transmits the heartbeat signal (flow B) to the stand-by side server 4 through the route 70.

In this case, each of the communication units 13, 11, 12, and 14 receives the heartbeat signal (flow B), outputs the received heartbeat signal (flow B) to the communication port L, and transmits it to the stand-by side server 4 through the route 70.

Also, the stand-by side server 4 receives the heartbeat signal, and when a reception stop period (a non-reception period) of the heartbeat signal does not exceeds the predetermined period, the stand-by side server 4 determines that the current operation side server 3 is in the possible state of service provision.

(State after Fault Occurrence)

When a fault has occurred in the current operation side server 3, the current operation side server 3 cannot perform the processing of the service request supplied from the client unit 9 through the route 73. Also, the current operation side server 3 cannot transmit the heartbeat signal to the stand-by side server 4 through the route 70. Or, the current operation side server 3 in which the fault has occurred stops the transmission of the heartbeat signal.

In this case, because the heartbeat signal (flow B) is not received for the predetermined period, the communication units 13, 11, 12, and 14 determine that the flow B has been disconnected. When the flow B is determined to have been disconnected, each of the communication units 13, 11, 12, and 14 refers to their flow table 111 and performs an operation based on the "operation information at disconnection" corresponding to the flow B. In an example shown in FIG. 3, each of the communication units 13, 11, 12, and 14 controls the flow to be outputted to the communication port L when receiving the flow of network address Z. Thus, each of the communication units 13, 11, 12, and 14 transmits the service request from the client unit 9 for the stand-by side server 4. On the other hand, the communication unit 10 which is not on the route 70 for the heartbeat signal (flow B) outputs the flow using the network address Z to communication port M as usual. However, the flow which is outputted to communication port M from the communication unit 10, is changed by the communication unit 11 such that the flow is outputted onto the route 74. Therefore, the flow using the network address Z and transmitted from the client unit 9 reaches the stand-by side server 4 through the route 74. Therefore, in the present invention, it is necessary to provide the determining section and the switching section at least in the communication unit 11 on the route 70 through which the heartbeat signal passes, and the routes 73 and 74 as switching targets.

Also, when not receiving the heartbeat signal for the predetermined period, the stand-by side server 4 determines that the current operation side server 3 is in the impossible state of service provision. When determining the impossible state of service provision, the stand-by side server 4 shifts to the execution mode, and starts the service performed in the current operation side server 3, by using the network address Z which is used by the current operation side server 3. Thus, the stand-by side server 4 takes over the service performed by the current operation side server 3 and the stand-by side server 4 performs processing of the service request from the client unit 9 by using the route 74, as shown in FIG. 5.

The communication units 13, 11, 12, and 14 in the present exemplary embodiment change the route into the route 74 between the client unit 9 and the stand-by side server 4, when confirming the disconnection of the heartbeat signal (the flow B). As a result, it is possible to early change to the network route 74 used when the stand-by side server 4 performs the processing in place of the current operation side server 3.

(Operation of Communication System and Effect)

In this way, the communication system of the present exemplary embodiment is provided with the client unit 9, the current operation side server 3 which performs processing in response to the request from the client unit 9, the stand-by side server 4 which performs processing in place of the current operation side server 3 when a fault has occurred in the current operation side server 3, and the communication units 10 to 14 which build the network routes 73, 74, and 70 between the client unit 9, the current operation side server 3 and the stand-by side server 4. Each of the communication units 10 to 14 is provided with the determining section 1121 which determines whether or not the signal (heartbeat signal) which is transmitted from the current operation side server 3 to the stand-by side server 4 has been disconnected, and the switching section 1122 which switches the network route to the route 74 used when the client unit 9 and the stand-by side server 4 perform data communication when determining when the signal has been disconnected.

Thus, the communication system of the present exemplary embodiment becomes possible to early perform the switching to the network route 74 which is necessary for the stand-by side server 4 to perform the processing in place of the current operation side server 3.

Second Exemplary Embodiment

Next, a second exemplary embodiment will be described.

In the first exemplary embodiment, each of the communication units 10 to 14 determines whether or not the signal (heartbeat signal) which is transmitted from the current operation side server 3 to the stand-by side server 4 has been disconnected. Then, each of the communication units 10 to 14 switches the network route to the route 74 used when the client unit 9 and the stand-by side server 4 perform data communication when the signal has been disconnected.

Figure 6:
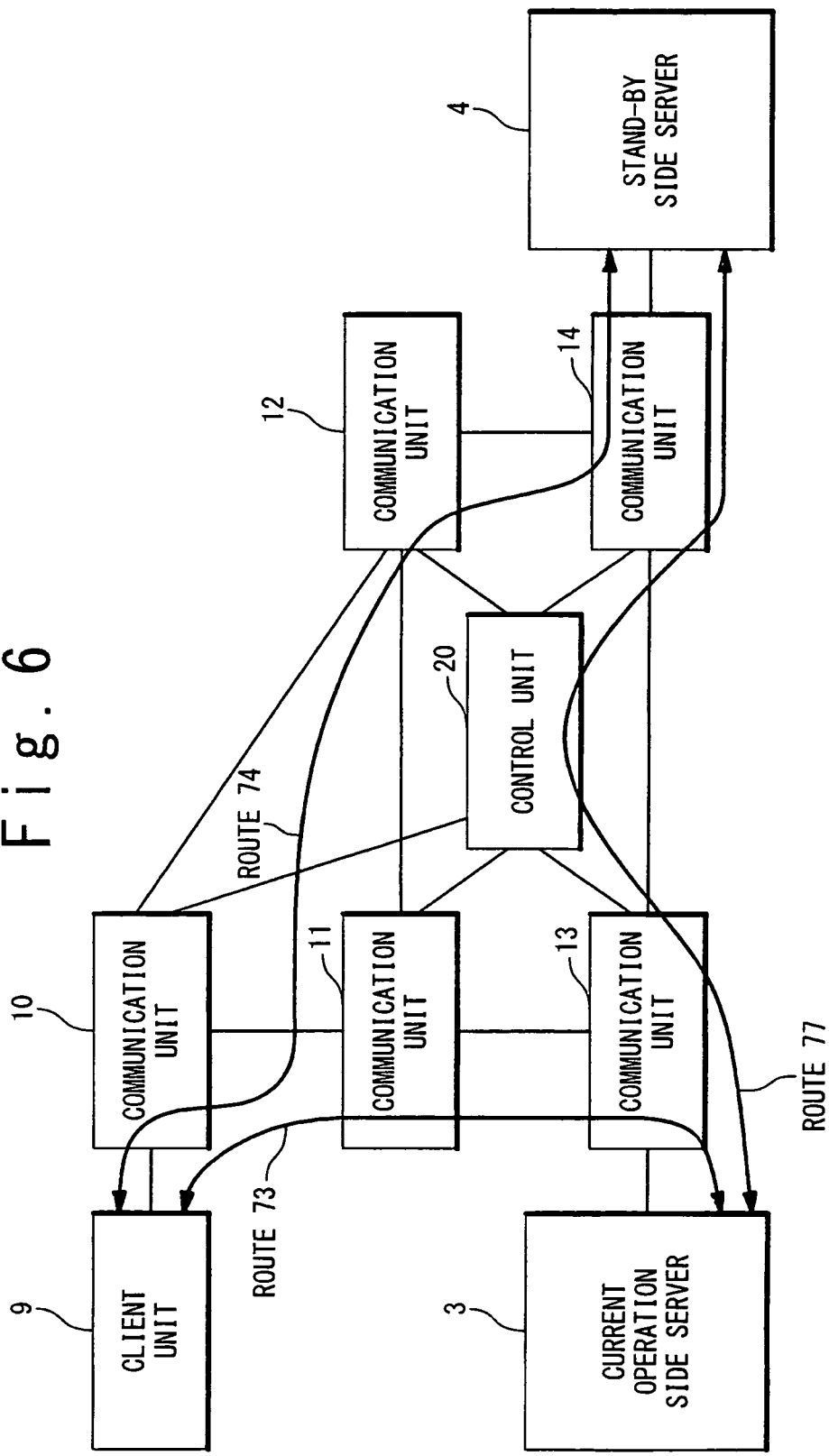
FIG. 6 is a diagram showing a system configuration of the communication system according to a second exemplary embodiment of the present invention.

In the second exemplary embodiment, as shown in FIG. 6, the communication system is provided with a control unit 20 which performs the integrated control of the communication units 10 to 14. The control unit 20 determines whether or not the signal (heartbeat signal) which is transmitted from the current operation side server 3 to the stand-by side server 4 has been disconnected. When the signal has been disconnected, the control unit 20 controls each of the communication units 10 to 14 to switch the network route to the route 74 used when the client unit 9 and the stand-by side server 4 perform data communication. Thus, the control unit 20 can control the communication units 10 to 14 and switch the network route to the route 74 used in a case of performing data communication by the client unit 9 and the stand-by side server 4. Hereinafter, referring to FIG. 6 to FIG. 10, the communication system of the present exemplary embodiment will be described.

<System Configuration of Communication System>

First, referring to FIG. 6, a system configuration of the communication system of the present exemplary embodiment will be described.

The communication system of the present exemplary embodiment is further provided with a control unit 20, compared with the configuration of the communication system of the first exemplary embodiment.

The control unit 20 is the unit which communicates with the communication units 10 to 14 and which controls the network routes configured by the communication units 10 to 14.

Figure 7:
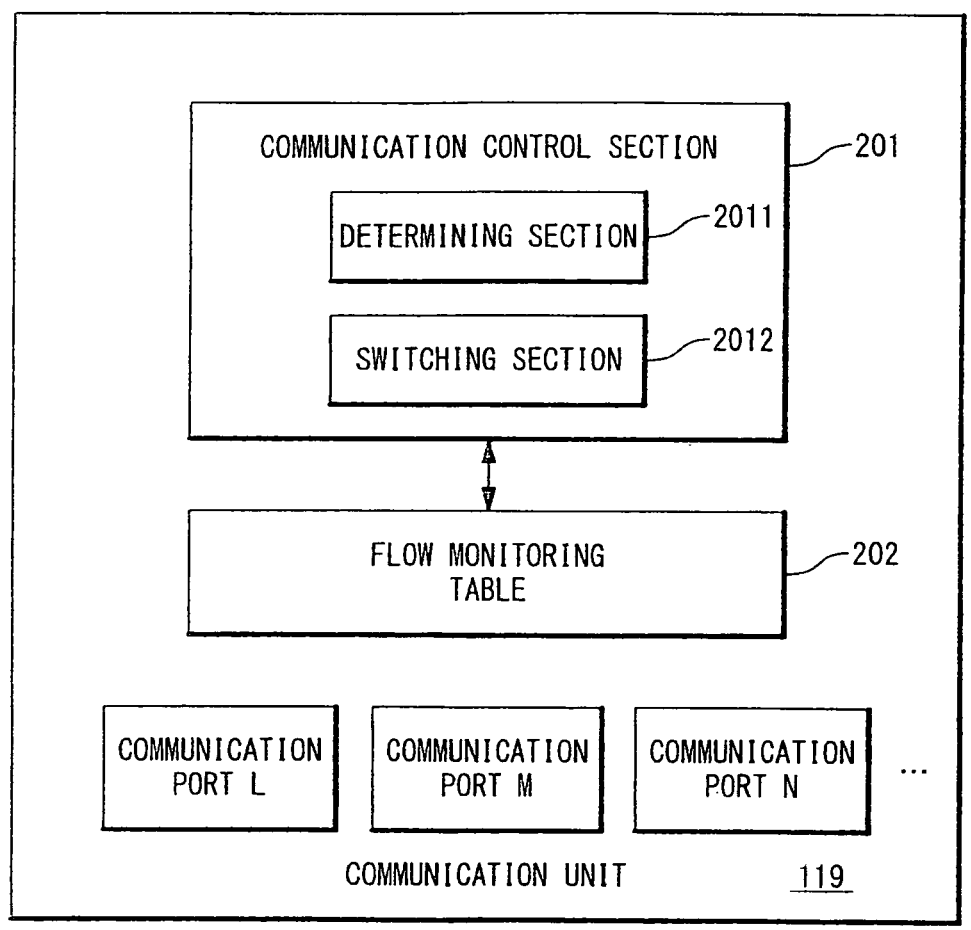
FIG. 7 is a diagram showing a configuration example of a control unit.

The control unit 20 is provided with a communication control section 201 and a flow monitoring table 202 as shown in FIG. 7. The communication control section 201 communicates with the communication units 10 to 14 in a peripheral area. The communication control section 201 is provided with a determining section 2011 and a control section 2012.

The determining section 2011 determines whether or not the network route should be switched, based on the heartbeat signal which is transmitted from the current operation side server 3 to the stand-by side server 4. The control section 2012 controls the switching operation of the network route configured by the communication units 10 to 14 according to the determination result by the determining section 2011. The switching operation of the network route is performed by transmitting a control signal to each of the communication units 10 to 14.

The flow monitoring table 202 manages the "flow information", the "output port information", and the "operation information at disconnection", like the flow table 111 shown in FIG. 3. With this, the control unit 20 can control a data transfer destination according to the flow information. The information managed by the flow monitoring table 202 can be built and changed through a manual operation by using an external unit and automatically dynamically by the control unit 20.

The "flow information" is information to specify the identification information of each flow. The "output port information" is information to specify the communication port which outputs data. The "operation information at disconnection" is information showing an operation to be done when a flow has been disconnected.

When the flow monitoring table 202 is same as that shown in FIG. 3, the control unit 20 operates as follows. That is, when the communication system receives the data in the flow A, the control unit 20 outputs the data in the flow A from the communication port N, and in a case of disconnection (in the state when the flow A has been disconnected), the control unit 20 performs communication control so as to do nothing. Also, when the communication system receives the data in the flow B, the control unit 20 controls to output the data in the flow B from the communication port L. On the other hand, in the state that the flow B has been disconnected, when one communication unit receives the flow of a network address Z, the control unit 20 controls each of the communication units 10 to 14 to output the flow of the network address Z to the communication port L.

Figure 8:
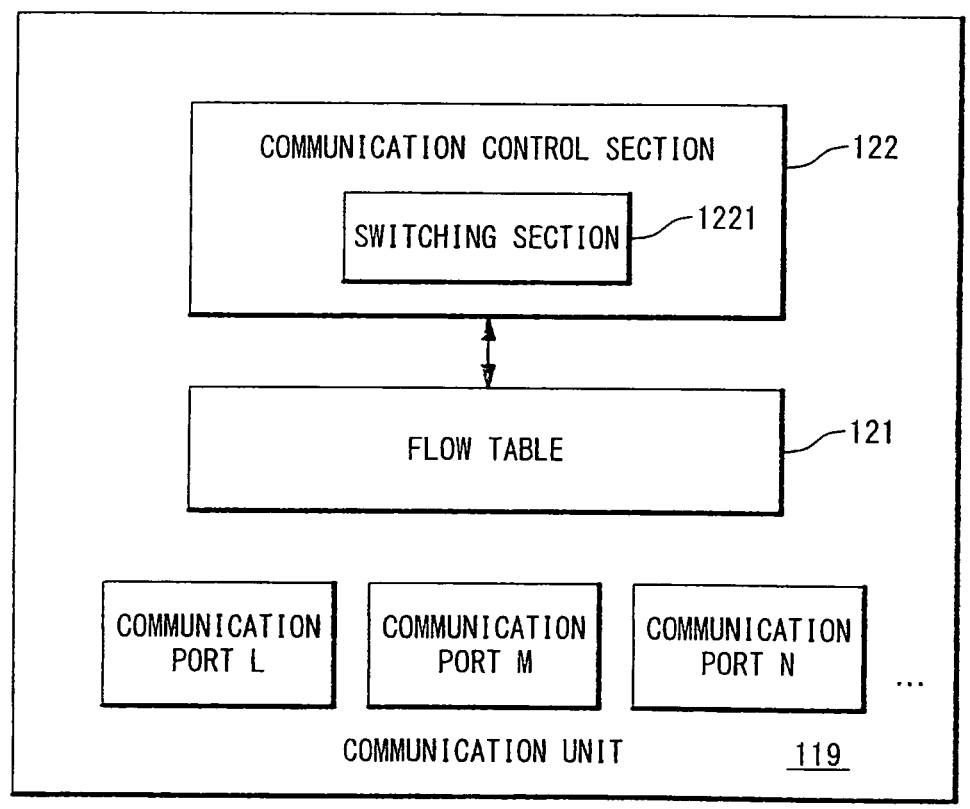
FIG. 8 is a diagram showing a configuration of a communication unit.

Each of the communication units 10 to 14 is provided with a flow table 121 and a communication control section 122, as shown in FIG. 8. The difference of the second exemplary embodiment from the first exemplary embodiment is in that the communication control section 122 in the second exemplary embodiment does not have the determining section to switch the communication route.

The flow table 121 is configured as in the first exemplary embodiment.

The communication control section 122 refers to the flow table 121 and performs the data transfer processing according to the flow table 121. The communication control section 122 has a switching section 1221.

The switching section 1221 switches the network route in response to a control signal received from the control unit 20.
<Processing Operation of Communication System>

Figure 9:
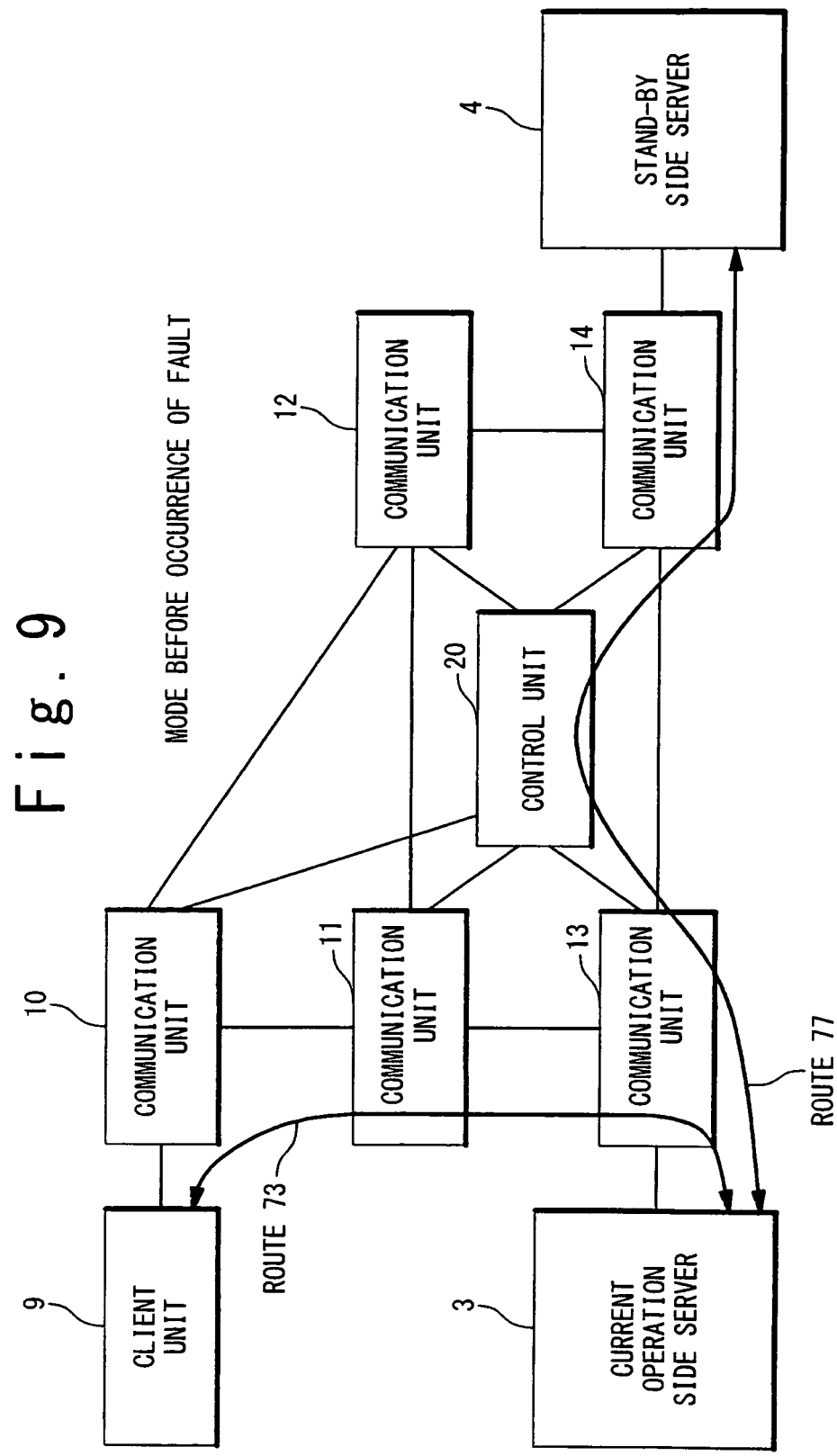
FIG. 9 is a diagram showing a communication route in a state before a fault occurs in the current operation side server.
Figure 10:
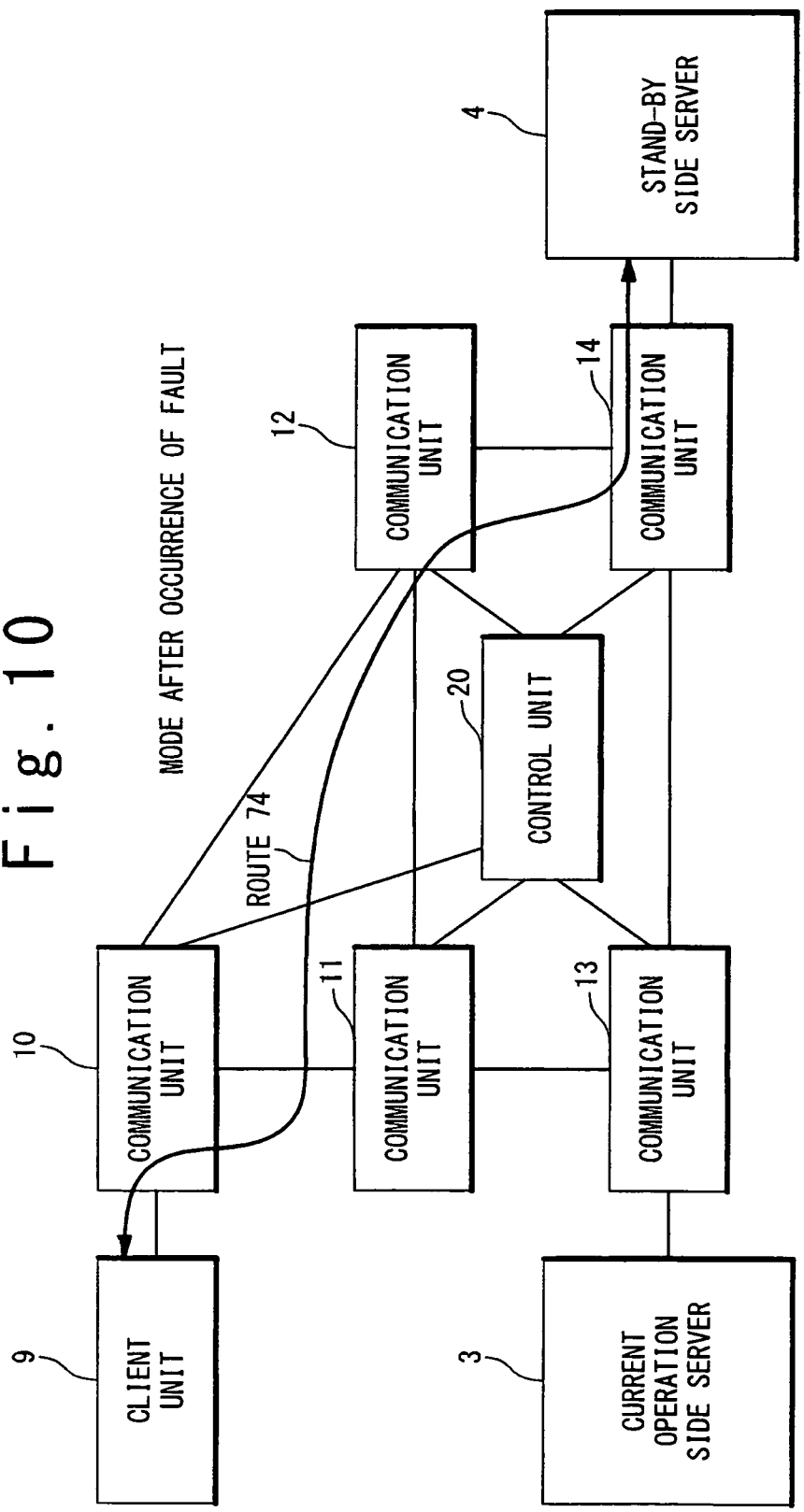
FIG. 10 is a diagram showing a communication route in a state after the fault has occurred in the current operation side server.

Next, referring to FIG. 6, FIG. 9, FIG. 10, the processing operation of the communication system of the present exemplary embodiment will be described. FIG. 9 shows the communication route in a state before a fault occurs in the current operation side server 3, and FIG. 10 shows the communication route in a state after the fault has occurred in the current operation side server 3.
(Precondition)

It is supposed that the current operation side server 3 is operating normally and that the current operation side server 3 is in the state that the service request from the client unit 9 can be processed, as the precondition of the communication system in the present exemplary embodiment.

When the stand-by side server 4 can receive the heartbeat signal periodically from the current operation side server 3, the stand-by side server 4 determines that the current operation side server 3 is in a possible state of service provision (in an operation state). The stand-by side server 4 is set to a standby mode when the current operation side server 3 is in the possible state of service provision. Also, when the heartbeat signal cannot be received in the predetermined period, the stand-by side server 4 determines that the current operation side server 3 is an impossible state of service provision (in a fault occurrence state). When the current operation side server 3 is in the impossible state of service provision, the stand-by side server 4 shifts to an execution mode. By using the network addresses used by the current operation side server 3, the stand-by side server 4 takes over the processing being performed by the current operation side server 3.

The communication route between the client unit 9 and the current operation side server 3 is the route 73 passing through the communication unit 10, the communication unit 11 and the communication unit 13. The route 73 is defined as using the communication port M. The communication route between the client unit 9 and the stand-by side server 4 is the route 74 passing through the communication unit 10, the communication unit 11, the communication unit 12 and the communication unit 14. The route 74 is defined as using the communication port L. The communication route for the heartbeat signal from the current operation side server 3 to the stand-by side server 4 is a route 77 passing through the communication unit 13, the control unit 20 and the communication unit 14. The route 77 is defined as using the communication port L. Also, the flow of the heartbeat signal is defined as the flow B.

It is supposed that the current operation side server 3 and the stand-by side server 4 have mechanisms possible to mutually communicate, in order to transmit and receive the heartbeat signal. For example, it is supposed that the current operation side server 3 and the stand-by side server 4 have the mechanisms which can use a method of assigning addresses different from an address used for service provision and a method of using a name solution system and so on.

It is supposed that a network address used to provide a service to the client unit 9 is defined as Z and that the current operation side server 3 is using the network address Z.
(Condition Before Fault Occurrence)

When the current operation side server 3 is operating, the current operation side server 3 performs the processing of the service request supplied from the client unit 9 through the route 73, as shown in FIG. 9. Also, the current operation side server 3 transmits the heartbeat signal (the flow B) to the stand-by side server 4 through the route 77.

In this case, the communication units 13 and 14 and the control unit 20 receives the heartbeat signal (the flow B), and outputs the received heartbeat signal (the flow B) to the communication port L and transmits the signal to the stand-by side server 4 through the route 77.

Also, the stand-by side server 4 receives the heartbeat signal, and when the blind period (the non-reception period) of the heartbeat signal does not exceed a predetermined period, the stand-by side server 4 determines that the current operation side server 3 is in the possible state of service provision.
(Condition after Fault Occurrence)

When a fault has occurred in the current operation side server 3, the current operation side server 3 cannot perform the processing of the service request supplied from the client unit 9 through the route 73. Also, the current operation side server 3 cannot transmit the heartbeat signal to the stand-by side server 4 through the route 77. Or, the current operation side server 3 in which the fault has occurred stops the transmission of the heartbeat signal.

In this case, because the heartbeat signal (the flow B) is not received in the predetermined period, the control unit 20 determines that the flow B has been disconnected. When the flow B is determined to have been disconnected, the control unit 20 refers to the flow monitoring table 202 to switch the operation of the communication units 10 to 14 based on the "operation information at disconnection" corresponding to the flow B. For example, the control unit 20 outputs a control signal to the communication units 10 to 14 according to the flow monitoring table 202 shown in FIG. 3. When receiving the flow of network address Z, each of the communication units 10 to 14 controls to output the flow to the communication port L in response to the control signal. Thus, each of the communication units 10 to 14 transmits a service request from the client unit 9 for the stand-by side server 4. In the present exemplary embodiment, it is necessary to provide the determining section to determine the disconnection of the heartbeat signal for the control unit 20 on the route 77 which the heartbeat signal passes at least.

Also, when the heartbeat signal cannot be received in the predetermined period, the stand-by side server 4 determines that the current operation side server 3 is the impossible state of service provision. When determining to be in the impossible state of service provision, the stand-by side server 4 shifts to the execution mode and starts the service having been performed by the current operation side server 3 by using the network address Z used by the current operation side server 3. Thus, the stand-by side server 4 takes over the service having been performed by the current operation side server 3 and performs the processing of the service request supplied from the client unit 9 through the route 74, as shown in FIG. 10.

When the disconnection of the heartbeat signal (the flow B) is confirmed, the control unit 20 in the present exemplary embodiment controls each of the communication units 10 to 14 to switch the network route to the route 74 between the client unit 9 and the stand-by side server 4. As a result, the switching of the network route which is necessary when the stand-by side server 4 performs the processing in place of the current operation side server 3 (the switching operation to the route 74) can be early performed. Also, it is possible to reduce the processing load of each of the communication units 10 to 14, since it is not necessary to confirm that the heartbeat signal (the flow B) has been disconnected.

(Operation of Communication System and Effect)

In this way, the communication system in the present exemplary embodiment is provided with the client unit 9, the current operation side server 3 which performs processing in response to the request from the client unit 9, the stand-by side server 4 which performs the processing in place of the current operation side server 3 when a fault has occurred in the current operation side server 3, the communication units 10 to 14 which build network routes 73, 74 and 77 between the client unit 9, the current operation side server 3 and the stand-by side server 4, and the control unit 20 which controls each of the communication units 10 to 14. The control unit 20 is provided with the determining section 2011 to determine whether or not the signal (heartbeat signal) which is transmitted from the current operation side server 3 to the stand-by side server 4 has been disconnected, and the control section 2012 which transmits the control signal to each of the communication units 10 to 14 to switch the network route to the route 74 used when the client unit 9 and the stand-by side server 4 perform data communication, when the determining section 2011 determines that the signal has been disconnected. Also, each of the communication units 10 to 14 is provided with a switching section 1221 to switch the network route to the route 74 used when the client unit 9 and the stand-by side server 4 perform data communication, when receiving the control signal from the control unit 20.

Thus, the communication system of the present exemplary embodiment can early switch the network route to the route 74 when it is necessary for the stand-by side server 4 to perform the processing in place of the current operation side server 3. Also, it is possible to reduce the processing load of each of the communication units 10 to 14, because it is not necessary to confirm that the heartbeat signal (the flow B) has been disconnected.

It should be noted that in the above exemplary embodiment, the control unit 20 is provided to determine whether or not the signal (heartbeat signal) which is transmitted from the current operation side server 3 to the stand-by side server 4 has been disconnected. However, one of the plurality of communication units 10 to 14 may charge the role of the control unit 20 to perform the above mentioned processing.

Third Exemplary Embodiment

Next, a third exemplary embodiment will be described.

In the first exemplary embodiment, each of the communication units 10 to 14 determines whether or not the signal (the heartbeat signal) which is transmitted from the current operation side server 3 to the stand-by side server 4 has been disconnected. Then, each of the communication units 10 to 14 switches the network route to the route 74 used when the client unit 9 and the stand-by side server 4 perform data communication, if the signal has been disconnected.

In the third exemplary embodiment, when the signal is not disconnected (when the transmission of the heartbeat signal is started), each of the communication units 10 to 14 switches the network route to the route 73 used when the client unit 9 and the current operation side server 3 perform data communication. Thus, each of the communication units 10 to 14 can early switch the network route to the route 73 when it is necessary for the current operation side server 3 to perform the processing having been performed by the stand-by side server 4. Hereinafter, referring to FIG. 1 to FIG. 2, and FIG. 11 to FIG. 13, the communication system of the present exemplary embodiment will be described.

<System Configuration of Communication System>

The communication system of the present exemplary embodiment is configured in the same way as the first exemplary embodiment shown in FIG. 1, but the configuration of each of the communication units 11 to 14 is different from that of the first exemplary embodiment.

Each of the communication units 11 to 14 in the present exemplary embodiment has a flow table 111 shown in FIG. 11.

The flow table 111 in the present exemplary embodiment manages the "flow information", the "output port information", and the "operation information at transmission start" as a set, as shown in FIG. 11. With this, the communication units 10 to 14 can control a data transfer destination based on the flow information.

The "flow information" is information to specify identification information of each flow. The "output port information" is information to specify the communication port for data to be outputted. The "operation information at transmission start" is information indicating an operation to be performed when the flow is started.

For example, the communication units 10 to 14 operate in accordance with the flow table 111 shown in FIG. 11, as follows. When receiving the data of the flow A, the communication unit outputs the data of the flow A from the communication port N, and performs nothing at the time of transmission start (when the transmission of the flow A is started). Also, when receiving the data of the flow B, the communication unit outputs the data of the flow B from the communication port M. On the other hand, when receiving the flow of the network address Z at the time of transmission start (when the transmission of the flow B is started), the communication unit outputs the flow of the network address Z to the communication port M.

<Processing Operation of Communication System>

Next, referring to FIG. 1, FIG. 12, and FIG. 13, the processing operation of the communication system in the present exemplary embodiment will be described. FIG. 12 shows the communication route when the current operation side server 3 is in the stop state, and FIG. 13 shows the communication route when the current operation side server 3 is in the operation state.

(Precondition)

It is supposed that the current operation side server 3 is in the stop state so that the service request from the client unit 9 cannot be processed, as the precondition of the communication system in the present exemplary embodiment.

When the heartbeat signal cannot be received in the predetermined period, the stand-by side server 4 determines that the current operation side server 3 is the impossible state of service provision (in the fault occurrence state). When the current operation side server 3 is in the impossible state of service provision, the stand-by side server 4 changes to the execution mode, and by using the network addresses having been used by the current operation side server 3, performs the processing in place of the current operation side server 3. Also, when the stand-by side server 4 receives the heartbeat signal in the predetermined period in the standby mode, the stand-by side server 4 determines that the current operation side server 3 has returned to the possible state of service provision (in the operation state). The stand-by side server 4 changes to the standby mode when the current operation side server 3 is in the possible state of service provision.

Referring to FIG. 1, the communication route between the client unit 9 and the current operation side server 3 is the route 73 passing through the communication unit 10, the communication unit 11 and the communication unit 13. The route 73 is defined as using the communication port M. The communication route between the client unit 9 and the stand-by side server 4 is the route 74 passing through the communication unit 10, the communication unit 11, the communication unit 12 and the communication unit 14. The route 74 is defined as using the communication port L. The communication route of the heartbeat signal from the current operation side server 3 to the stand-by side server 4 is the route 70 passing through the communication unit 10, the communication unit 11, the communication unit 12 and the communication unit 14. The route 70 is defined as using the communication port L. Also, the flow of the heartbeat signal is defined as the flow B. It is supposed that the current operation side server 3 and the stand-by side server 4 have the mechanisms possible to mutually communicate in order to transmit and receive the heartbeat signal. For example, it is supposed that the current operation side server 3 and the stand-by side server 4 have the mechanisms which can use a method of having addresses different from the address used for service provision and a method of using a name solution system and so on.

It is supposed that the network addresses used to provide a service to the client unit 9 are defined as Z and the stand-by side server 4 is using the network address Z.

(Stopping State)

When the current operation side server 3 is in the stop state, the current operation side server 3 cannot process the service request from the client unit 9 by using the route 73. Also, the current operation side server 3 cannot transmit the heartbeat signal to the stand-by side server 4 by using the route 70. Or, stopping the current operation side server 3 stops the transmission of the heartbeat signal.

In this case, when not receiving the heartbeat signal in the predetermined period, the stand-by side server 4 determines that the current operation side server 3 is the impossible state of service provision. When determining that the current operation side server 3 is the impossible state of service provision, the stand-by side server 4 changes to the execution mode and performs the processing of the service request from the client unit 9 by using the route 74 and using network address Z, as shown in FIG. 12.

(Operating State)

When the current operation side server 3 is set to the operation state, the current operation side server 3 performs the processing of the service request from the client unit 9 by using the route 73 as shown in FIG. 13. Also, the current operation side server 3 transmits the heartbeat signal (the flow B) to the stand-by side server 4 through the route 70.

In this case, when the communication units 13, 11, 12, and 14 receive the heartbeat signal (the flow B), the communication unit outputs the received heartbeat signal (the flow B) to the communication port L and transmits it to the stand-by side server 4 through the route 70. Also, because receiving the heartbeat signal (the flow B), the communication units 13, 11, 12, and 14 determine that the transmission of the flow B has been started. When the transmission of the flow B is determined to have been started, each of the communication units 13, 11, 12, and 14 refers to its own flow table 111 and operates based on the transmission start operation information corresponding to the flow B. In an example shown in FIG. 11, each of the communication units 13, 11, 12, and 14 controls to output the flow to the communication port M when receiving the flow of network address Z. Thus, each of the communication units 13, 11, 12, and 14 transmits the service request from the client unit 9 for the current operation side server 3.

Also, when the stand-by side server 4 receives the heartbeat signal, and a reception stopping period of the heartbeat signal (the non-reception period) does not exceed the predetermined period, the stand-by side server 4 determines that the current operation side server 3 is the possible state of service provision. When determining that the current operation side server 3 is in the possible state of service provision, the stand-by side server 4 changes to the standby mode and ends the processing.

When it is confirmed that the transmission of the heartbeat signal (the flow B) is started, each of the communication units 13, 11, 12, and 14 in the present exemplary embodiment controls to switch the network route to the route 73 between the client unit 9 and the current operation side server 3. As a result, the switching operations to the network route 73 is earlier carried out when the current operation side server 3 performs the processing having been performed by the stand-by side server 4.

(Operation of Communication System and Effect)

In this way, the communication system of the present exemplary embodiment is provided with the client unit 9, the current operation side server 3 which performs processing in response to a request from the client unit 9, the stand-by side server 4 which performs the processing in place of the current operation side server 3 when a fault has occurred in the current operation side server 3, and the communication units 10 to 14 which configure network routes 73, 74, and 70 between the client unit 9 and the current operation side server 3 or the stand-by side server 4. Each of the communication units 10 to 14 is provided with the determining section 1121 to determine whether or not the signal (the heartbeat signal) which is transmitted from the current operation side server 3 to the stand-by side server 4 has been disconnected, and the switching section 1122 to switch the network route to the route 73 used when the client unit 9 and the current operation side server 3 perform data communication when the determining section 1121 determines that the signal is not disconnected (when the transmission of the heartbeat signal is started).

With this, the communication system in the present exemplary embodiment can early switch the network route to the route 73 when the current operation side server 3 performs the processing having been performed by the stand-by side server 4.

It should be noted that the exemplary embodiments mentioned above do not limit a scope of the present invention, and various modifications are possible in a range which is not apart from the spirit of the present invention.

For example, the above exemplary embodiments can be combined with each other. Specifically, the mechanism shown in the third exemplary embodiment which performs a switching operation in case of transmission start of the heartbeat signal may be performed in the control unit 20 and the communication units 10 to 14 in the second exemplary embodiment.

That is, the control unit 20 is provided with the determining section 2011 to determine whether or not the signal (heartbeat signal) which is transmitted from the current operation side server 3 to the stand-by side server 4 has been disconnected, and the control section 2012 which transmits the control signal to each of the communication units 10 to 14 to switch the network route to the route 73 used when the client unit 9 and the current operation side server 3 perform data communication, when the determining section 2011 determines that the signal is not disconnected (when the transmission of the heartbeat signal is started). Also, when receiving the control signal from the control unit 20, each of the communication units 10 to 14 is provided with the switching section 1221 to switch the network route to the route 73 used when the client unit 9 and the current operation side server 3 perform data communication. With this, it becomes possible early switch the network route to the route 73 which is necessary for the current operation side server 3 to perform the processing having been performed by the stand-by side server 4. Also, each of the communication units 10 to 14 can reduce the processing load because it is not necessary to confirm whether or not the transmission of the heartbeat signal (the flow B) is started.

Also, a system switching mechanism in disconnection of the heartbeat signal, as shown in the first and second exemplary embodiments, and a system switching mechanism in a case of transmission start of the heartbeat signal as shown in the third exemplary embodiment may be combined.

Also, in the above exemplary embodiments, when the heartbeat signal (the flow B) cannot be received in a predetermined period, the flow B is determined to have been disconnected. However, if it is possible to determine whether or not the flow B has been disconnected, any of the techniques can be applied. For example, if a signal is used in the communication protocol to explicitly show communication disconnection, the disconnection of the flow may be recognized based on the signal.

Also, the above exemplary embodiments have been described under the presupposition of a fail-over. However, the table data managed by the flow table 111 and 121 and the flow monitoring table 202 may be dynamically changed, and the network route may be dynamically switched using the changed data. Thus, it is possible to build a configuration which is applicable to the cascade fail-over.

Also, the control operation of each of the units of the communication system in the above-mentioned exemplary embodiments may be executed by using in hardware, software, or in composite manner of both.

It should be noted that when the processing is executed by using the software, it is possible to install a program describing a processing sequence in a memory of a computer which is incorporated into the exclusive-use hardware configuration. Or, the program may be installed in and executed by the general-purpose computer which can execute various processing.

For example, the program can be recorded in advance in a hard disk and ROM (Read Only Memory) as a storage medium. Or, the program can be temporarily or indissolubly stored (recorded) in a removable storage medium in advance. Such a removable storage medium can be provided as so-called packaged software. It should be noted that as the removable storage medium, a floppy disk (registered trademark), CD-ROM (Compact Disc-Read Only Memory), MO (Magneto-optical) disk, DVD (Digital Versatile Disc), a magnetic disk, a semiconductor memory and so on are exemplified.

It should be noted that program installed from the removable storage medium into the computer. Also, the program may be transferred in radio from a download site to the computer. Also, through the network, the program may be transferred to the computer by a wire.

Also, the communication system in the present exemplary embodiment, can be configured not only by executing the processing operation described in the above exemplary embodiments in a time series but also by executing the processing operation in parallel or individually according to necessity or according to processing capability of the processor.

The present invention can be applied to Web service, a data center, and a cloud computing system to have a redundancy.

It should be noted that the present patent application claims a priority on convention based on Japan Patent Application No. 2009-027376 and the disclosure thereof is incorporated herein by reference.

(Addition 1)
<Communication System>

The communication system according to the present invention is provided with a client unit, a first node which performs processing in response to a request from the client unit, and a second node which performs processing in place of the first node when a fault has occurred in the first node, and communication units which configure network routes among the client unit, the first node and the second node. The communication unit is provided with a determining section configured to determine whether or not a signal which is transmitted from the first node to the second node has been disconnected, and a switching section configured to switch the network route between a first network route used when the client unit and the first node perform data communication, and a second network route used when the client unit and the second node perform data communication. The switching section switches the route based on the determination result of the determining section.

(Addition 2)

The communication system according to the present invention is provided with a client unit, a first node which performs processing in response to a request from the client unit, a second node which performs processing in place of the first node when a fault has occurred in the first node, communication units which configure network routes among the client unit, the first node and the second node, a control unit which controls the communication units. The communication unit is provided with a switching section which switches the network route between a first network route used when the client unit and the first node perform data communication, and a second network route used when the client unit and the second node perform data communication. The control unit is provided with a determining section to determine whether or not a signal which is transmitted from the first node to the second node has been disconnected, and a control section which transmits control signals based on the determination result by the determining section to the communication units. The switching section switches the network route in response to the received control signal from the control unit.

(Addition 3)
<Communication Unit>

A communication unit according to the present invention is a communication unit in a communication system which is provided with a client unit, a first node which performs processing in response to a request from the client unit, a second node which performs the processing in place of the first node when a fault has occurred in the first node, and the communication units which configure the network routes among the client unit, the first node and the second node. The communication unit is provided with a determining section to determine whether or not a signal which is transmitted from the first node to the second node has been disconnected, and a switching section which switches the network route between a first network route used when the client unit and the first node perform data communication, and a second network route used when the client unit and the second node perform data communication. The switching section switches the route based on the determination result by the determining section.

(Addition 4)
<Control Unit>

A control unit according to the present invention is a control unit in a communication system which is provided with a client unit, a first node which performs processing in response to a request from the client unit, a second node which performs the processing in place of the first node when a fault has occurred in the first node, communication units which configure network routes among the client unit, the first node and the second node, and the control unit which controls the communication units. The control unit is provided with a determining section to determine whether or not a signal which is transmitted from the first node to the second node has been disconnected, and a control unit which transmits control signals to the communication units based on the determination result by the determining section, and controls the communication units to switch the network rote between the first network route used when the client unit and the first node perform data communication and the second network route used when the client unit and the second node perform data communication.

(Addition 5)
<Control Method>

A method of controlling according to the present invention is a control method in a communication system which is provided with a client unit, a first node which performs processing in response to a request from the client unit, a second node which performs the processing in place of the first node when a fault has occurred in the first node, communication units which configure network routes among the client unit, the first node and the second node. The control method of present invention includes a step of determining whether or not a signal which is transmitted from the first node to the second node has been disconnected, and a step of switching the network route between a first network route used when the client unit and the first node perform data communication, and a second network route used when the client unit and the second node perform data communication. The switching includes a step of switching the network route based on the determination result of the determining step.

(Addition 6)

A control method according to the present invention is a control method performed by a control unit in a communication system which is provided with a client unit, a first node which performs processing in response to a request from the client unit, a second node which performs the processing in place of the first node when a fault has occurred in the first node, communication units which configure network routes among the client unit, the first node and the second node, and the control unit which controls the communication units. The control method of the present invention includes a step of determining whether or not a signal which is transmitted from the first node to the second node has been disconnected, and a control step of transmitting control signals to the communication units based on the determination result in the determining step and controlling the communication units to switch the network route between a first network route used when the client unit and the first node perform data communication, and a second network route used when the client unit and the second node perform data communication.

(Addition 7)
<Program>

A program according to the present invention is a program to make a computer of one of communication units to execute, in a communication system which is provided with a client unit, a first node which performs processing in response to a request from the client unit, a second node which performs the processing in place of the first node when a fault has occurred in the first node, the communication units which configure network routes among the client unit, the first node and the second node and the communication system. The program of the present invention makes the computer to execute a step of determining whether or not a signal which is transmitted from the first node to the second node has been disconnected, and a step of switching the network route between a first network route used when the client unit and the first node perform data communication and a second network route used when the client unit and the second node perform data communication. Through the switching, the network route can be switched based on the determination result of the determining.

(Addition 8)

A program according to the present invention is a program to make a computer of a control unit to execute, in a communication system which is provided with a client unit, a first node which performs processing in response to a request from the client unit, a second node which performs the processing in place of the first node when a fault has occurred in the first node, communication units which configure network routes among the client unit, the first node and the second node, and the control unit which controls the communication units. The program of the present invention includes a step of determining whether or not a signal which is transmitted from the first node to the second node has been disconnected, and a control step of transmitting control signals to the communication units based on the determination result in the determining, and controlling the communication units to switch the network route between a first network route used when the client unit, and the first node perform data communication, and a second network route used when the client unit and the second node perform data communication.

What is claimed is:

1. A communication system comprising:
a client unit;
a first node configured to perform processing in response to a request from said client unit;
a second node configured to perform the processing in place of said first node when a fault has occurred in said first node;
communication units configured to configure network routes among said client unit, said first node and said second node; and
a determining section provided onto a first network route of said network routes and configured to determine whether a signal which is transmitted from said first node to said second node through the first network route has been disconnected,
wherein each of said communication units comprises:
a switching section configured to perform a switching operation between a second network route of said network routes used when said client unit and said first node perform data communication and a third network route of said network routes used when said client unit and said second node perform data communication, based on the determination result of said determining section,
wherein a communication unit of the communication units comprises a communication control section which includes the determining section and the switching section,
wherein the communication unit further comprises a plurality of communication ports, and a flow table which is accessible by the communication control section and includes information for controlling a flow of data from the communication unit to a data transfer destination,
wherein the information in the flow table includes:
flow information which specifies identification information of the flow of data;
output port information which specifies a communication port from which the data should be outputted; and
operation information at disconnection which shows an operation to be performed when the flow of data has been disconnected,
wherein the signal transmitted from the first node to the second node comprises a heartbeat signal which is transmitted from the first node to the second node via the communication unit,
wherein if the heartbeat signal is not received by the communication unit for a predetermined period, then the communication unit determines that the flow has been disconnected, and refers to the flow table and performs an operation based on the operation information at disconnection corresponding to the flow, and
wherein the communication units comprise an other communication unit which is not on a route for the heartbeat signal being transmitted from the first node to the second node, and a flow from the other communication unit is switched by the communication unit to the second node.

2. The communication system according to claim 1, wherein said switching section switches to said third network route from said second network route, when said determining section determines that said signal has been disconnected.

3. The communication system according to claim 1, wherein said switching switches to said second network route from said third network route, when said determining section determines that said signal is not disconnected.

4. The communication system according to claim 1, wherein said determining section determines that the signal has been disconnected, when a heartbeat signal as the signal which is transmitted from said first node to said second node cannot be received in a predetermined period, and determines that the signal has not been disconnected, when said heartbeat signal can be received in the predetermined period.

5. The communication system according to claim 1, wherein said determining section and said switching section are both provided in each of said communication units which configure said first and second network routes.

6. The communication system according to claim 1, wherein said determining section and said switching section are both provided in each of said communication units which configure said first, second and third network routes.

7. The communication system according to claim 1, further comprising a control unit configured to output control signals based on the determination result of said determining section,
wherein each of said communication units performs the switching operation in response to one of the control signals.

8. The communication system according to claim 1, wherein the communication control section refers to the flow table and performs data transfer processing according to the flow table.

9. The communication system according to claim 1, wherein the first node comprises a current operation side server which operates a service application in response to the request from the client unit.

10. The communication system according to claim 9, wherein the second node comprises a stand-by server, and the signal transmitted from the first node to the second node comprises a heartbeat signal which is transmitted periodically from the current operation side server to the stand-by server, and
wherein if the stand-by server receives the heartbeat signal, then the stand-by side server determines that the current operation side server is in a normal operation state.

11. The communication system according to claim 10, wherein if the stand-by server does not receive the heartbeat signal in a predetermined period, then the stand-by side server:
determines that a fault has occurred in the current operation side server;
shifts from a stand-by mode to an execution mode; and
uses a network address used by the current operation side server and takes over a processing being performed by the current operation side server.

12. The communication system according to claim 1, wherein the communication units comprise one of a network switch and a network router.

13. A control method in a communication system which includes a client unit, a first node configured to perform processing in response to a request from said client unit, a second node configured to perform the processing in place of said first node when a fault has occurred in said first node, and communication units configured to configure network routes among said client unit, said first node and said second node, said control method comprising:
determining whether a signal which is transmitted from said first node to said second node through a first network route of said network routes has been disconnected, onto the first network route; and
switching a second network route of said network routes used when said client unit and said first node perform data communication to a third network route of said network routes used when said client unit and said second node perform data communication based on the determination result,
wherein a communication unit of the communication units comprises a communication control section which includes a determining section for performing the determining of whether the signal has been disconnected, and a switching section for performing the switching of the second network route,
wherein the communication unit further comprises a plurality of communication ports, and a flow table which is accessible by the communication control section and includes information for controlling a flow of data from the communication unit to a data transfer destination,
wherein the information in the flow table includes:
flow information which specifies identification information of the flow of data;
output port information which specifies a communication port from which the data should be outputted; and
operation information at disconnection which shows an operation to be performed when the flow of data has been disconnected,
wherein the signal transmitted from the first node to the second node comprises a heartbeat signal which is transmitted from the first node to the second node via the communication unit,
wherein if the heartbeat signal is not received by the communication unit for a predetermined period, then the communication unit determines that the flow has been disconnected, and refers to the flow table and performs an operation based on the operation information at disconnection corresponding to the flow, and wherein the communication units comprise an other communication unit which is not on a route for the heartbeat signal being transmitted from the first node to the second node, and a flow from the other communication unit is switched by the communication unit to the second node.

14. The control method according to claim 13, further comprising:
outputting control signals based on said determination result,
wherein said switching comprises switching said second network route by said communication units in response to said control signals.

15. A computer-readable non-transitory storage medium which stores a computer-executable program code for attaining a control method in a communication system which includes a client unit, a first node configured to perform processing in response to a request from said client unit, a second node configured to perform the processing in place of said first node when a fault has occurred in said first node, communication units which configure network routes among said client unit, said first node and said second node, and a control unit provided onto a first network route of said network routes, said control method comprising:
determining that a signal which is transmitted from said first node to said second node through said first network has been disconnected;
outputting control signals from said control unit to said communication units; and
performing a switching operation between a second network route of said network routes used when said client unit and said first node perform data communication and a third network route of said network routes used when said client unit and said second node perform data communication, by said communication units in response to said control signals,
wherein a communication unit of the communication units comprises a communication control section which includes a determining section for performing the determining of whether the signal has been disconnected, and a switching section for performing the switching between the second and third network routes,
wherein the communication unit further comprises a plurality of communication ports, and a flow table which is accessible by the communication control section and includes information for controlling a flow of data from the communication unit to a data transfer destination,
wherein the information in the flow table includes:
flow information which specifies identification information of the flow of data;
output port information which specifies a communication port from which the data should be outputted; and
operation information at disconnection which shows an operation to be performed when the flow of data has been disconnected,
wherein the signal transmitted from the first node to the second node comprises a heartbeat signal which is transmitted from the first node to the second node via the communication unit,
wherein if the heartbeat signal is not received by the communication unit for a predetermined period, then the communication unit determines that the flow has been disconnected, and refers to the flow table and performs an operation based on the operation information at disconnection corresponding to the flow, and
wherein the communication units comprise an other communication unit which is not on a route for the heartbeat signal being transmitted from the first node to the second node, and a flow from the other communication unit is switched by the communication unit to the second node.

* * * * *